United States Patent
Weiss et al.

(10) Patent No.: US 9,402,155 B2
(45) Date of Patent: Jul. 26, 2016

(54) SYSTEM AND METHOD FOR INDICATING A STATE OF A GEOGRAPHIC AREA BASED ON MOBILE DEVICE SENSOR MEASUREMENTS

(71) Applicant: WaveMarket, Inc., Emeryville, CA (US)

(72) Inventors: Andrew Weiss, San Ramon, CA (US); Scott Hotes, Berkeley, CA (US)

(73) Assignee: Location Labs, Inc., Emeryville, CA (US)

( * ) Notice: Subject to any disclaimer, the term of this patent is extended or adjusted under 35 U.S.C. 154(b) by 137 days.

(21) Appl. No.: 14/195,351

(22) Filed: Mar. 3, 2014

(65) Prior Publication Data

US 2015/0249904 A1    Sep. 3, 2015

(51) Int. Cl.
*H04W 4/02* (2009.01)

(52) U.S. Cl.
CPC .............. *H04W 4/023* (2013.01); *H04W 4/026* (2013.01); *H04W 4/027* (2013.01)

(58) Field of Classification Search
USPC ..................................................... 455/456.1
See application file for complete search history.

(56) References Cited

U.S. PATENT DOCUMENTS

| | | | |
|---|---|---|---|
| 5,564,079 A | 10/1996 | Olsson | |
| 5,833,479 A | 11/1998 | Talbot | |
| 6,052,064 A | 4/2000 | Budnik et al. | |
| 6,243,039 B1 | 6/2001 | Elliot | |
| 6,266,534 B1 | 7/2001 | Raith et al. | |
| 6,437,696 B1 | 8/2002 | Lemelson et al. | |
| 6,496,701 B1 | 12/2002 | Chen et al. | |
| 6,571,193 B1 | 5/2003 | Unuma et al. | |
| 6,701,234 B1 | 3/2004 | Vogelsang et al. | |
| 6,711,404 B1 | 3/2004 | Arpee et al. | |
| 6,813,502 B2 | 11/2004 | Son et al. | |
| 6,816,720 B2 | 11/2004 | Hussain et al. | |
| 6,834,180 B1 | 12/2004 | Marshall | |
| 6,834,195 B2 | 12/2004 | Brandenberg et al. | |
| 6,856,805 B1 | 2/2005 | Raaf | |
| 6,873,850 B2 | 3/2005 | Dowling et al. | |
| 6,885,874 B2 | 4/2005 | Grube et al. | |

(Continued)

FOREIGN PATENT DOCUMENTS

| | | | |
|---|---|---|---|
| DE | EP 2264988 A1 * | 12/2010 | ........... A61B 5/1118 |
| EP | 0982964 | 3/2000 | |

(Continued)

OTHER PUBLICATIONS

European search report dated Jul. 23, 2010 for PCT AU2006000348.

(Continued)

*Primary Examiner* — Jinsong Hu
*Assistant Examiner* — Jean Chang
(74) *Attorney, Agent, or Firm* — Dovas Law, P.C.

(57) ABSTRACT

A method and corresponding system for providing an indication of one or more states of a geographic area. The method includes acquiring sensor data including sensor measurements taken by a plurality of mobile devices at a plurality of locations and acquiring location data corresponding to the plurality of locations of the sensor measurements. At least one processor determines one or more states of a geographic area corresponding to the plurality of locations based on the sensor data, and an indication is provided of the one or more states of the geographic area to a particular user.

41 Claims, 10 Drawing Sheets

(56) References Cited

U.S. PATENT DOCUMENTS

| | | | |
|---|---|---|---|
| 6,895,238 B2 | 5/2005 | Newell et al. | |
| 6,950,664 B2 | 9/2005 | Chen et al. | |
| 6,957,074 B2 | 10/2005 | Wang et al. | |
| 6,961,562 B2* | 11/2005 | Ross | H04W 64/00 342/450 |
| 6,985,696 B2 | 1/2006 | Bromham et al. | |
| 7,042,338 B1 | 5/2006 | Weber | |
| 7,046,147 B2 | 5/2006 | Stigall | |
| 7,248,961 B2 | 7/2007 | Park et al. | |
| 7,593,740 B2 | 9/2009 | Crowley et al. | |
| 7,606,772 B2 | 10/2009 | Flinn et al. | |
| 7,881,864 B2 | 2/2011 | Smith | |
| 8,073,907 B2 | 12/2011 | Roumeliotis et al. | |
| 8,145,240 B2 | 3/2012 | Roumeliotis et al. | |
| 8,229,421 B2 | 7/2012 | Hotes et al. | |
| 8,244,236 B2 | 8/2012 | Roumeliotis et al. | |
| 8,355,737 B2 | 1/2013 | MacNaughtan et al. | |
| 9,071,939 B2* | 6/2015 | Hategan | G06Q 30/0259 |
| 9,147,336 B2* | 9/2015 | Schultz | G08G 1/205 |
| 2002/0101834 A1 | 8/2002 | Stanley | |
| 2002/0116266 A1 | 8/2002 | Marshall | |
| 2002/0120187 A1 | 8/2002 | Eiffert et al. | |
| 2003/0043941 A1 | 3/2003 | Johnson et al. | |
| 2003/0060213 A1 | 3/2003 | Heinonen et al. | |
| 2003/0216960 A1 | 11/2003 | Porstrel | |
| 2004/0030531 A1 | 2/2004 | Miller et al. | |
| 2004/0116111 A1 | 6/2004 | Saunders | |
| 2004/0122734 A1 | 6/2004 | Schleicher et al. | |
| 2004/0214584 A1 | 10/2004 | Marinier | |
| 2005/0085257 A1 | 4/2005 | Laird et al. | |
| 2005/0195193 A1 | 9/2005 | Lehman | |
| 2005/0282540 A1 | 12/2005 | Motamedi et al. | |
| 2005/0282559 A1 | 12/2005 | Erskine et al. | |
| 2006/0009234 A1 | 1/2006 | Freer | |
| 2006/0019665 A1 | 1/2006 | Aghvami et al. | |
| 2006/0019679 A1 | 1/2006 | Rappaport et al. | |
| 2006/0089878 A1 | 4/2006 | Roberts et al. | |
| 2006/0105815 A1* | 5/2006 | Jendbro | H04W 64/00 455/566 |
| 2006/0135120 A1 | 6/2006 | Likourezos | |
| 2006/0200435 A1 | 9/2006 | Flinn et al. | |
| 2006/0270421 A1 | 11/2006 | Phillips et al. | |
| 2007/0010248 A1 | 1/2007 | Dravida et al. | |
| 2007/0030824 A1 | 2/2007 | Ribaudo et al. | |
| 2007/0100595 A1 | 5/2007 | Earles | |
| 2007/0136102 A1 | 6/2007 | Rodgers | |
| 2007/0142068 A1 | 6/2007 | Matsuo | |
| 2007/0218900 A1 | 9/2007 | Abhyanker | |
| 2007/0273558 A1 | 11/2007 | Smith et al. | |
| 2007/0282678 A1 | 12/2007 | Dendi et al. | |
| 2008/0018453 A1 | 1/2008 | Adler | |
| 2008/0027634 A1 | 1/2008 | Obradovich et al. | |
| 2008/0071749 A1 | 3/2008 | Schloter | |
| 2008/0077489 A1 | 3/2008 | Gilley et al. | |
| 2008/0119207 A1 | 5/2008 | Harris | |
| 2008/0139899 A1 | 6/2008 | Student | |
| 2008/0146250 A1 | 6/2008 | Aaron | |
| 2008/0153511 A1 | 6/2008 | Mock | |
| 2010/0007503 A1 | 1/2010 | Carrington | |
| 2010/0049095 A1 | 2/2010 | Bunn | |
| 2010/0093376 A1 | 4/2010 | Del Castillo et al. | |
| 2010/0142715 A1* | 6/2010 | Goldstein | H04R 1/1083 381/56 |
| 2010/0241496 A1 | 9/2010 | Gupta et al. | |
| 2010/0306138 A1 | 12/2010 | Hotes et al. | |
| 2011/0087431 A1 | 4/2011 | Gupta et al. | |
| 2011/0207408 A1* | 8/2011 | Lefebvre | H04L 67/104 455/41.2 |
| 2011/0294457 A1 | 12/2011 | Braznell | |
| 2012/0077523 A1 | 3/2012 | Roumeliotis et al. | |
| 2012/0135756 A1 | 5/2012 | Rosso et al. | |
| 2012/0202528 A1 | 8/2012 | Roumeliotis et al. | |
| 2013/0150117 A1* | 6/2013 | Rodriguez | G06T 7/00 455/550.1 |
| 2013/0214925 A1 | 8/2013 | Weiss | |
| 2013/0218812 A1 | 8/2013 | Weiss | |
| 2013/0297547 A1* | 11/2013 | Ding | G06N 5/02 706/46 |
| 2014/0024399 A1* | 1/2014 | Shimo | H04W 64/006 455/457 |
| 2015/0134418 A1* | 5/2015 | Leow | G06Q 30/0205 705/7.34 |

FOREIGN PATENT DOCUMENTS

| | | |
|---|---|---|
| EP | 1175115 | 1/2002 |
| WO | WO 9848578 | 10/1998 |
| WO | WO 02073997 | 9/2002 |

OTHER PUBLICATIONS

International search report dated Apr. 26, 2006 for PCT AU2006000348.

U.S. Appl. No. 12/917,286, filed Mar. 27, 2003, Weiss.

Streetadvisor.com, publication date unknown (access date Jun. 18, 2008).

C. Thompson, J. White, B. Dougherty, A. Albright and D.C. Smith, "Using Smartphones to Detect Car Accidents and Provide Situational Awareness to Emergency Responders" Third International Conference-Mobileware, Jun. 2010.

Rifkin, Ryan and Aldebaro Klautau "In Defense of One-Vs-All Classification" The Journal of Machine Learning Research 2004 [Online] Downloaded Oct. 16, 2014.

Doukas, Charalampos et al "Patient Fall Detection using Support Vector Machines" 2007 international Federation for Information w Processing, vol. 247 [Online] Downloaded Oct. 16, 2014 http://download.springer.com/static/pdf/534/chp%253A 10.1007%252F978-0-387-74161-1_16.pdf?auth66= 14134 721 05 _a535aa368cd19e5f11410aa309aec530&ext=.pdf.

Kim, Kyu-jin et al "Dementia Wandering Detection and Activity Recognition Algorithm Using Tri-axial Accelerometer Sensors" IEEE 2009 [Online] Downloaded Feb. 1, 2016 http://ieeexplore.ieee.org/xpls/abs_all.jsp?arnumber=5405672&tag=1.

Hendrich, Ann "Predicting Patient Falls" AJN Nov. 2007 vol. 107, No. 11 [Online] Downloaded Oct. 16, 2014 http://www.lmsresourceinfo.com/media/Falls%20-%20 Predicting%20Patient%20Falls.pdf.

Glick, henry "Introduction to Markov MOdels" Jul. 2007 [Online] Downloaded Oct. 16, 2014 http://www.uphs.upenn.edu/dgimhsr/acadcrs/korea07/08.markovmodels.pdf.

* cited by examiner

SYSTEM AND METHOD FOR INDICATING A STATE OF A GEOGRAPHIC AREA BASED ON MOBILE DEVICE SENSOR MEASUREMENTS

BACKGROUND

Mobile communication devices ("mobile devices") such as smartphones typically include a variety of hardware sensors for collecting environmental data and data regarding a state of the device. The sensors are used by variety of applications and services on the device to enhance device usability and user experience. Sensors can include for example accelerometers, microphones, proximity sensors, luxmeters, GPS receivers, magnetometers, and gyroscopes.

An accelerometer measures acceleration a device may experience, for example sensing shock or vibration in the pocket or vehicle of the device user. A microphone can be used to sense voice to enable telephone communications or for recording environmental sounds. A proximity sensor can for example generate an electromagnetic field and detect changes in the field to determine how close the device is to a person or object. A lux meter can measure ambient light. A GPS receiver uses data from Global Positioning System satellites to determine a position of the device. A magnetometer determines an orientation of the device relative to the earth's magnetic field, for example north, south, east, and west. Changes in the orientation of the device can be determined based on detection by a gyroscope of angular rate of the device.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method for providing an indication of one or more states of a geographic area is provided. The method includes acquiring sensor data based on sensor measurements taken by a plurality of mobile devices at a plurality of locations and acquiring location data corresponding to the plurality of locations of the sensor measurements. At least one processor determines one or more states of a geographic area corresponding to the plurality of locations based on the sensor data, and an indication is provided of the one or more states of the geographic area to a particular user.

A computing system is provided comprising one or more non-transitory computer readable storage mediums having encoded thereon instructions that, when executed by one or more processors of the system, cause the system to perform a process. The process includes acquiring sensor data based on sensor measurements taken by a plurality of mobile devices at a plurality of locations, and acquiring location data corresponding to the plurality of locations of the sensor measurements. One or more processors determine one or more states of a geographic area corresponding to the plurality of locations based on the sensor data, and an indication is provided of the at least one state of the geographic area to a particular user.

A computer network comprising a computing system and a plurality of mobile devices is provided. The computing system is configured for acquiring sensor data including sensor measurements taken by the plurality of mobile devices at a plurality of locations and acquiring location data corresponding to the plurality of locations of the sensor measurements. The computing system is further configured for determining, by at least one processor, one or more states of a geographic area corresponding to the plurality of locations based on the sensor data, and providing an indication of the one or more states of the geographic area to a particular user. The plurality of mobile devices are configured for taking sensor measurements, acquiring location data corresponding to the sensor measurements, and transmitting the sensor data and location data to the computing system.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Figure 1:
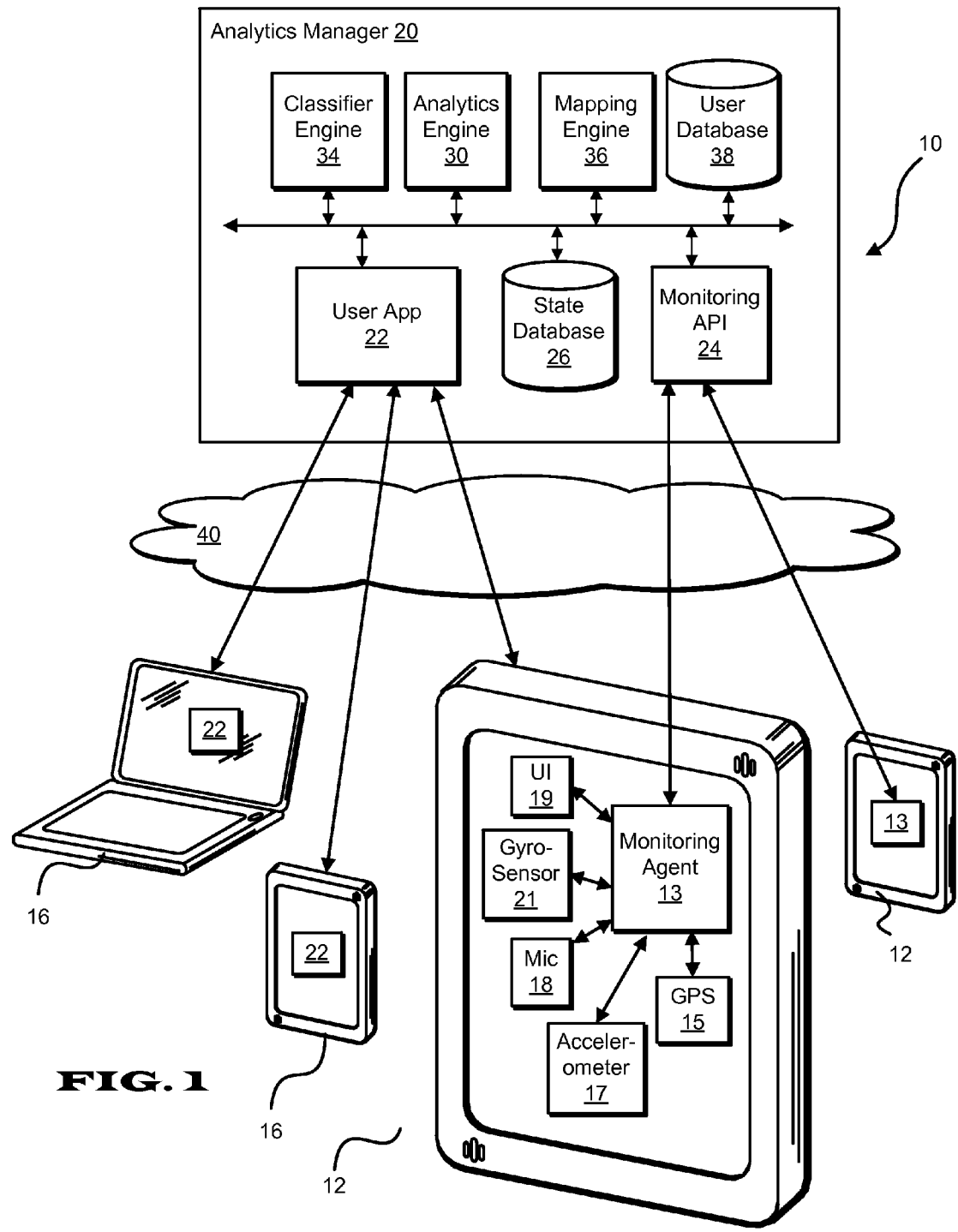
FIG. 1 is a diagram of a system for providing indication of a state of a geographic area based on sensor data from a plurality of mobile devices.

Embodiments of the invention are described below with reference to the drawing figures wherein like numerals represent like elements throughout.

Referring to FIG. 1, a system 10 is provided including an analytics manager 20 configured to aggregate and process data from mobile devices to determine the state of a geographic location. The analytics manager 20 is configured to derive analytical information describing the nature of particular attributes concerning a geographic region based on data acquired via mobile communication devices ("mobile devices") 12. The analytics manager 20 can function in a communications network 40, preferably including one or more wired or wireless networks or a combination thereof. The analytics manager 20 and its constituent elements are preferably implemented on one or more network connectable processor-enabled computing systems via hardware components, software components sharing one or more processing units, or a combination hardware and software components. The analytics manager 20 need not be implemented on a single system at a single location, but can be decentralized for example in a peer-to-peer configuration, for example operating on two or more of the mobile devices 12.

Modern mobile devices enable collection of location data, for example via Global Positioning System ("GPS") hardware or cell tower triangulation, such that accurate location of a device can be derived. Further modern mobile devices typically have an associated collection of sensors such as sound recording sensors and accelerometers. Systems described herein are configured to derive geographic analytics combining mobile device location derivation with sensor output. It should be understood that the sensors described herein are exemplary and other device sensors can be employed in the derivation of such analytics.

The analytics manager 20 enables a user application 22, a monitoring application program interface ("API") 24, a state database 26, an analytics engine 30, a classifier engine 34, a mapping engine 36, and a user database 38. The analytics manager 20 can be implemented on one or more network accessible computing systems in communication via a network 40 with a mobile device 12 which corresponds to a monitored user and is monitored via a monitoring agent 13. Alternatively, the analytics manager 20 or one or more components thereof can be executed on the monitored mobile communication device 12 or other system or a plurality of systems. The user application 22 includes a web application or other application enabled by the analytics manager 20 and accessible to the mobile device 12 or other client device 16 via a network and/or executed by the mobile device 12 or client device 16.

Software and/or hardware residing on a monitored mobile device 12 enables the monitoring agent 13 to provide an indication of a state of geographic location, for example an environmental condition, to the analytics manager 20 via the monitoring API 24, or alternatively, to provide the analytics manager 20 with data for determining a state of the geographic location. The mobile device 12 can include for example a smartphone or other cellular enabled mobile device preferably configured to operate on a wireless telecommunication network. In addition to components enabling wireless communication, the mobile device 12 includes a location determination system, such as a global positioning system (GPS) receiver 15, an accelerometer 17, a gyro-sensor, and a microphone 18, from which the monitoring agent 13 gathers data used for predicting a location's state. A monitored user carries the mobile device 12 on their person with the monitoring agent 13 active.

Figure 2:
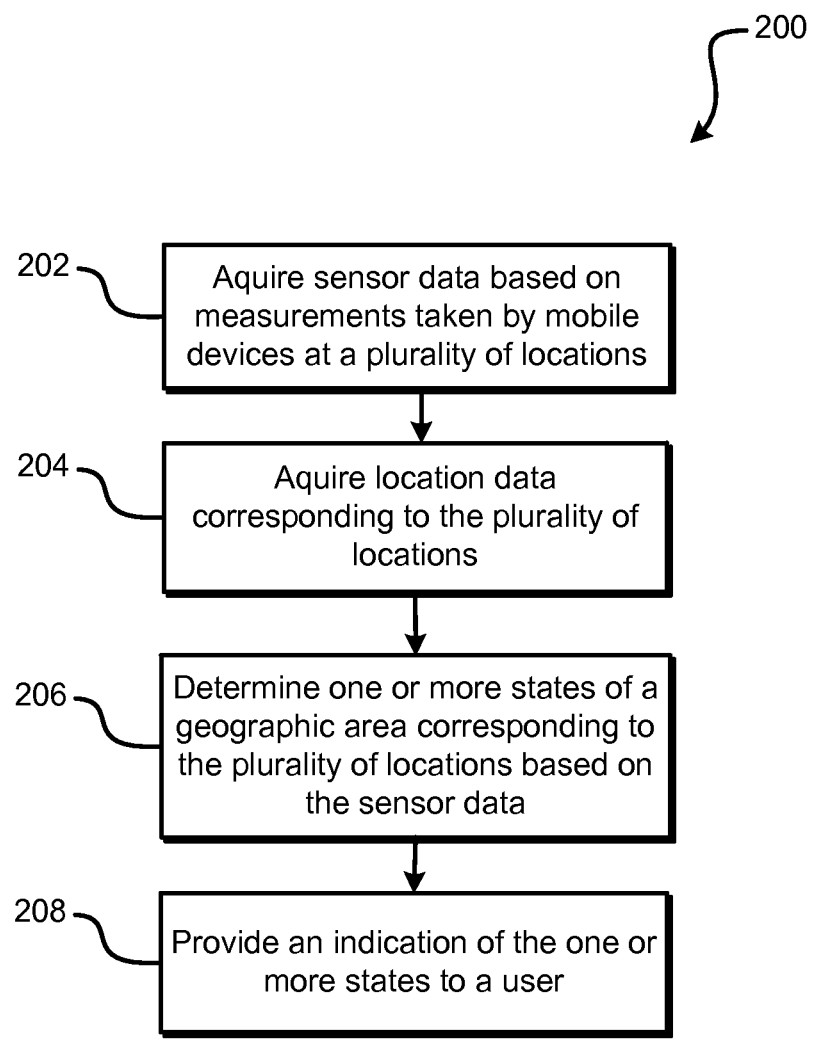
FIG. 2 is a flowchart showing a method for providing an indication of one or more states of a geographic area.

Referring to FIG. 2, a method 200 is shown for providing an indication of one or more states of a geographic area. The method 200 and associated processes are described with reference to the components shown in the system 10 of FIG. 1, including the analytics manager 20 and monitoring agent 13, which are preferably configured for performing the method 200. The method 200 may alternatively be performed via other suitable systems. The method 200 includes acquiring sensor data based on sensor measurements taken by a plurality of mobile devices 12 at a plurality of locations (step 202). The method 200 further includes acquiring location data corresponding to the plurality of locations of the sensor measurements (step 204), and determining, by at least one processor, one or more states of a geographic area corresponding to the plurality of locations based on the sensor data (step 206). An indication of the at least one state of the geographic area is provided to a particular user (step 208).

The sensor measurements can include for example sound recordings and acceleration measurements from sensors on the plurality of mobile devices 12. An application on a mobile device 12 can enable the monitoring manager 13 which samples a given sensor, for example the microphone 18, and substantially simultaneously determines a location of the mobile device 12 and generates a time stamp. The sensor data and the location data can be transmitted by the mobile device to the analytics manager 20, for example executed on a network connectable server system, which determines by a processor or processors the one or more states of the geographic area based on the sensor data.

The mobile devices 12 can further transmit indications of their respective device types, device operating systems, and device settings to the analytics manager 20, wherein the analytics manager 20 determines the one or more states further based on one or more of the device type, the device operating system ("OS"), and the device settings corresponding respectively to the plurality of mobile devices 12. Sensor measurements collected by the monitoring agent 13 can be preprocessed prior to transmission to the analytics manager 20 to determine an aggregate or a set of aggregates for a set of sensors on a mobile device 12. Deriving aggregates can act to decrease the overall amount of communication that takes place through a network between the monitoring agent 13 on the mobile device 12 and the analytics manager 20. The plurality of mobile devices 12 determine aggregates based on the sensor measurements respectively taken by the plurality of mobile devices. The aggregates and respective location data are transmitted by the mobile devices 12 to the analytics manager 20 which determines by a processor-enabled analytics engine 30 the one or more states of the geographic area based on the aggregates.

Data transmitted from a mobile device 12 via the monitoring agent 13 to the analytics manager 20 can be transmitted in the form of a tuple including location, time, mobile device type, OS, device settings, type of sensor/aggregate measurement, and sensor/aggregate measurement. An application, for example downloaded from many device users from an online application store, can enable the monitoring agent 13 on a large collection of mobile devices 12 providing a data source in the form of a multitude of tuples. Such application once installed on a mobile device 12 is preferably configured to operate without user intervention.

Data from a tuple can be processed by a classifier to determine a value or values over which analytics are to be derived. In such manner a classifier can be applied to one or more of the sensor data, the device type, the device operating system, and the device settings to determine one or more states of a geographic area. This classifier can be run by the monitoring agent 13 on the mobile device 12, or alternatively, the analytics manager 20, for example on a server system accessible through the network 40. In a particular illustrative example, decibel levels can be derived from a sound sample associated with a tuple from a particular mobile device 12. Further, data specifying the device type, OS, and settings can optionally be used along with the sound sample in the determination of decibel levels.

It would be desirable to determine if there are factors that are biasing or attenuating sensor measurements. Sensor measurements may be biased or attenuated for example if the mobile device 12 is in a user's pocket. Such bias can be derived by determining a baseline sensor measurement based on sensor measurements corresponding to a particular mobile device 12 or user taken over a period of time, and comparing the baseline measurements with that of a particular sensor measurement of a tuple being analyzed to determine a normalized value for the particular measurement. A difference between the particular sensor measurement and average, local sensor measurements (near in time to the particular measurement, e.g., ±4 hours) can be used to derive the normalized value for the particular measurement. One or more states of a geographic area can be determined based on the normalized value of the particular measurement, for example in combination with other normalized measurements or non-normalized measurements via the analytics engine 30 of the analytics manager 20.

Determining the one or more states of a geographic area in step 206 of the method 200 above can correspond to determining one or more categories corresponding to the sensor measurements. Sensor measurements (normalized or non-normalized) can be run through a categorical classifier via the analytics engine 30 to determine the categories of sensor measurements occurring in a particular geographic area. With respect to sound measurements, determined categories can include for example construction noise, lawn work, traffic, train whistle blasts, gun shots, bomb blasts, crowds, and riots. Sound recordings from sensors (e.g., microphone 18) on a plurality of mobile devices 12 can be analyzed in aggregate to determine a state of a geographic area. Periodic crowd yelling, horns blowing coupled with a general level of human generated noise, can be indicative of a sporting event. Motion measurements can also be used to characterize a geographic area. For example, a group of people classified as running can be indicative of a disturbance, particularly in an area where running does not generally occur. In such case acceleration measurements from sensors (e.g., accelerometer 18) on a plurality of mobile devices 12 can be analyzed in aggregate to determine a state of a geographic area, the state corresponding for example to the disturbance.

One or more types of sensor measurements can be used in the determination of a type of geographic area. Sensor measurements including acceleration measurements and sound measurements can be processed in aggregate by the analytics engine 30 by applying a classifier to determine a type of geographic area. For example, a persistent detection of talking, combined with a generally slow motion walking pace can result in the determination that an area is a shopping mall.

Sensor measurements from a plurality of mobile devices 12 (e.g., acceleration and sound measurements) can be considered in aggregate to determine one or more states at particular times throughout the day, week, month, or other suitable time range. The state can correspond for example to the density of people within a particular geographic area at a particular time, wherein determining one or more states includes estimating the density of the people within the particular geographic area at particular times. Based on the times (e.g., time of day, day of week) when particular states are observed to occur in a particular geographic area, future states of the particular geographic area at particular times can be predicted. For example, observed rates of motion of mobile devices 12 in a shopping mall can be compared to predict at what times the mall is expected to be more or less crowded.

Determining one or more states of a geographic area can include determining implicit categories corresponding to the sensor measurements. Determining implicit categories may be useful in cases where no explicit label exists for a grouping of measurements. For example, a categorical classifier implemented by the analytics engine 30 may determine that a number of sound measurements are highly similar to one another such that they would be in the same category, without there being such an explicit category defined. A clusterization algorithm, such as K-Nearest Neighbor with a metric for sound similarity, can be used to establish these implicit categories. A metric for measuring similarity between sensor measurements can include mapping sensor measurements to an n-dimensional vector space.

An indication of the implicit categories can be provided to a plurality of users of the mobile devices 12 by the user application 22 via a user interface 19. Users can provide descriptions corresponding to the implicit categories in the form of explicit labels, for example "shopping mall", "sports stadium", "riot", "parade". The analytics manager 20 can associate explicit labels with implicit categories and store the associations in the state database 26. When providing an indication of one or more states to a particular user, the indication can include an explicit label provided by the particular user or one or more other entities, for example other users of mobile devices 12.

When a suitable number of sensor measurements have been collected by the analytics manager 20 for a particular geographic area over a variety of time of day, day of week, or day of year time descriptors, relative sensor measurements can be characterized over a particular geographic area with respect to time. For example, in the case of sound measurements analyzed to derive decibel metrics of a geographic area, a map of the geographic area generated by the mapping engine 36 can show areas having relatively high noise levels at particular hours of the day, particular days of the week, or particular months of the year. Such visual representations could be of interest to someone in the market to purchase a home and wishing to avoid noise from a highway that selectively reflects off hills in the area. Alternatively, visual representations of other states, such as crowd density, can be shown over a geographic area. Such visual representations can show differences in one or more states at different times for example showing a change in one or more states over a particular time period.

Figure 3A:
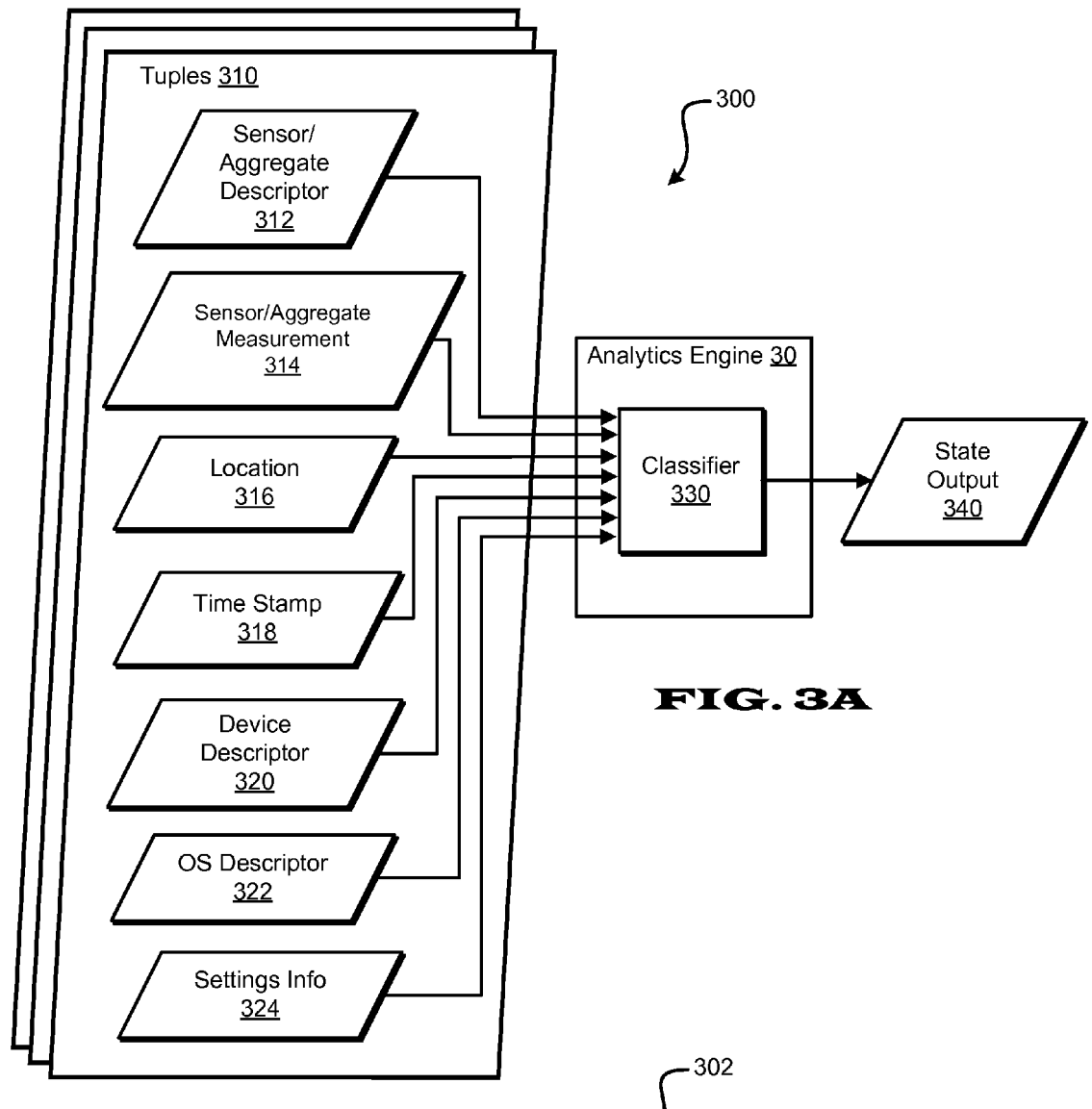
FIG. 3A is a schematic showing a classification process for sensor data.
Figure 3B:
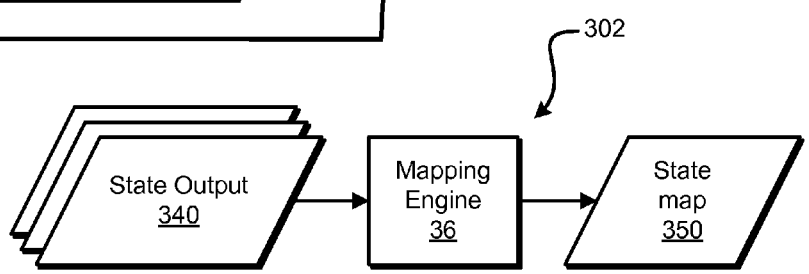
FIG. 3B is a schematic showing a process for generating a map based on geographic state data.

Referring further to FIG. 3A, a schematic of a classification process 300 is shown in which a plurality of tuples 310 originating from one or more mobile devices 12 are fed to the analytics engine 30 of the analytics manager 20 which implements a classifier 330 to generate a state output 340 including one or more states of a particular geographic area. The tuples include a sensor/aggregate descriptor 312 identifying the type of sensor or type of sensor measurement aggregate, a sensor/aggregate measurement 314 including a measurement or aggregate of measurements, location data 316 corresponding to the sensor/aggregate measurement, and one or more of a time stamp 318 corresponding to the measurement, a device descriptor 320 indicating the type of mobile device 12 which made the measurement, an operating system ("OS") descriptor 322 indicating the operating system on the device 12, and settings information corresponding to settings on the device 12. The analytics engine 30 can apply a classifier 330 to the tuples 310 individually to produce outputs based on individual tuples 310. Alternatively, the analytics engine 30 can apply the classifier 330 to a plurality of tuples 310 from one or more mobile devices 12 in aggregate to produce state output 340 including one or more states of a particular geographic area. Referring to FIG. 3B, the state output 340 can be processed by the mapping engine 36 of the analytics manager 20 to produce a map 350 enabling a user to visualize the state output 340. Exemplary maps are set forth in FIGS. 5A-5C, 6A-6C, and 10-14.

Figure 4:
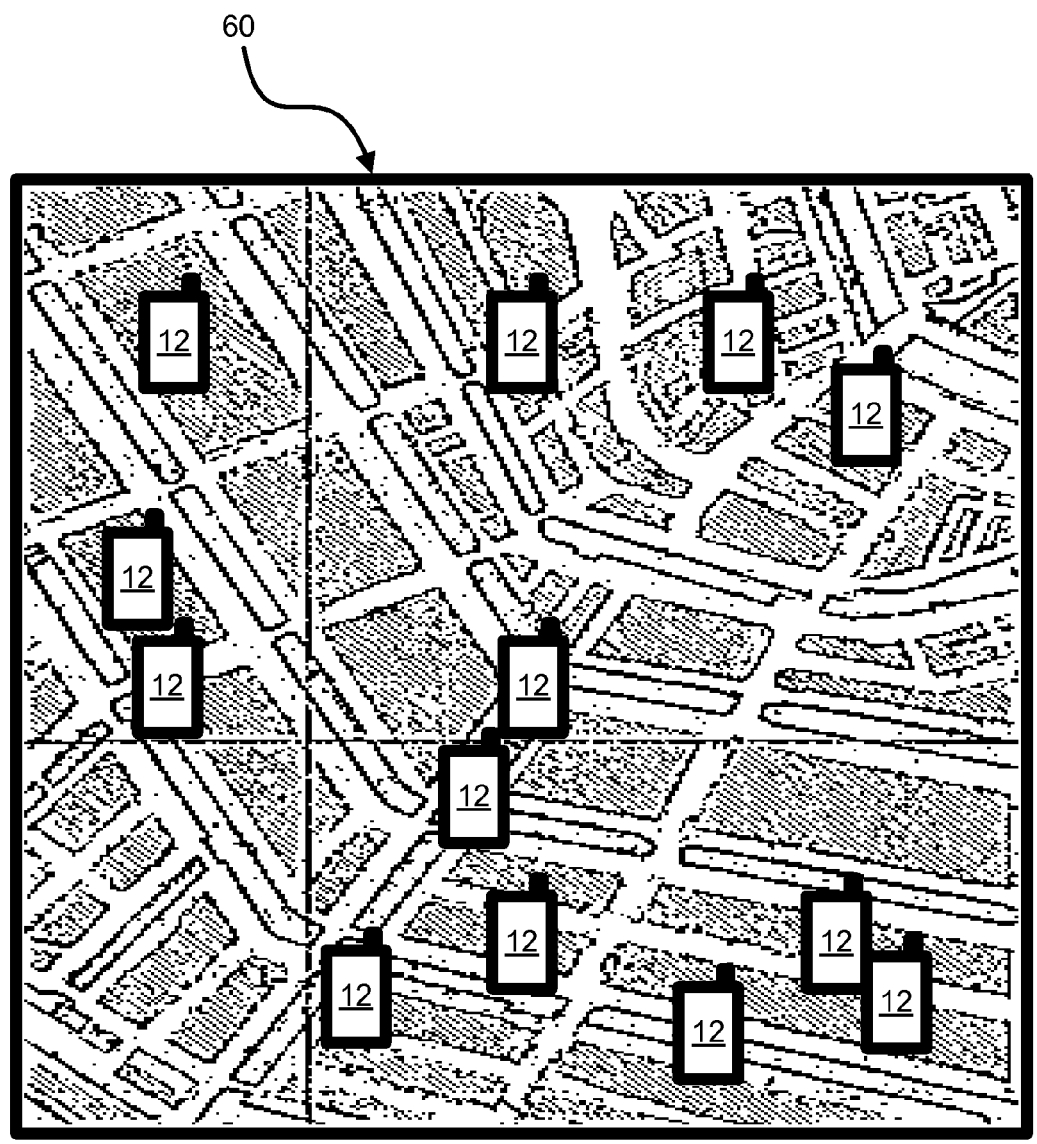
FIG. 4 is a schematic showing a particular geographic area including mobile devices configured for taking sensor measurements.
Figure 5A:
FIG. 5A-5C show heat maps of sound level in the particular geographic area displayed on a device.
Figure 5B:
Figure 5C:
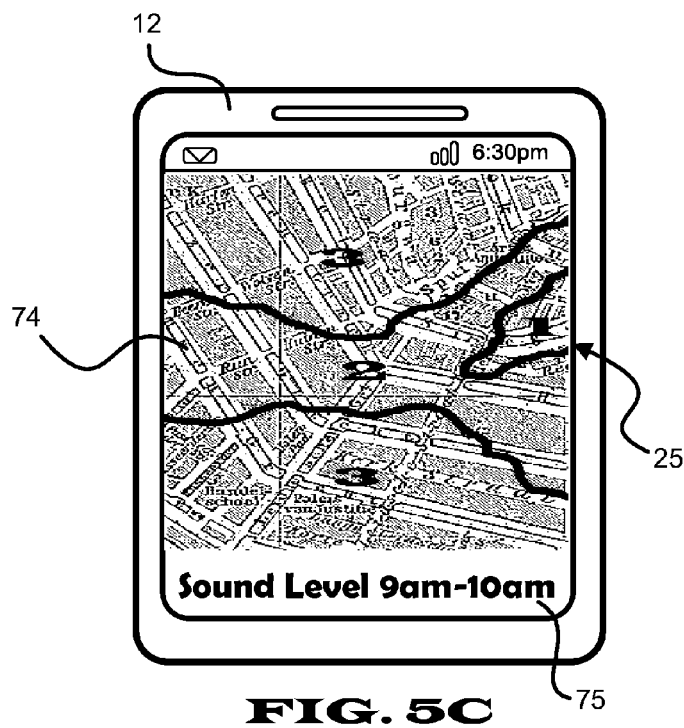

FIG. 4 shows an exemplary schematic map area 60 including a plurality of mobile devices 12 in the area 60 at a particular time configured for taking sensor measurements, for example acceleration measurements and sound measurements. FIGS. 5A, 5B, and 5C show the map area 60 displayed in heat maps 70, 72, 74 corresponding to a particular day on a display 25 of one of the mobile devices 12. Alternatively, the heat maps 70, 72, 74 can be displayed by another device 16, mobile or wired, not running the monitoring agent 13. The heat maps 70, 72, 74 are enabled on the display 25 by the user application 22. The heat maps 70, 72, 74 are generated based on sensor measurements including sound measurements which are run through a classifier in the analytics engine 30 to estimate sound levels in areas bounded by dark lines within the heat maps 70,72,74. Dimensionless sound levels represented by "1" for relatively low sound levels, "2" for relatively medium sound levels, and "3" for relatively high sound levels are displayed within the bounded areas to show relative sound levels during indicated time periods on the particular day. Labels 71, 73, 75 respectively correspond to the heat maps 70, 72, 74, wherein the first heat map 70 corresponds to 7:00 am to 8:00 am, the second heat map 72 corresponds to 8:00 am to 9:00 am, and the third heat map 74 corresponds to 9:00 am to 10:00 am.

Figure 6A:
FIG. 6A-6C show heat maps of crowd density in the particular geographic area displayed on a device.
Figure 6B:
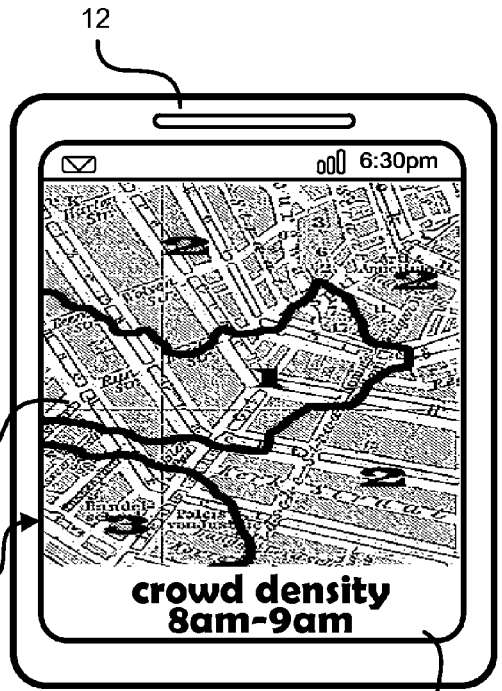
Figure 6C:
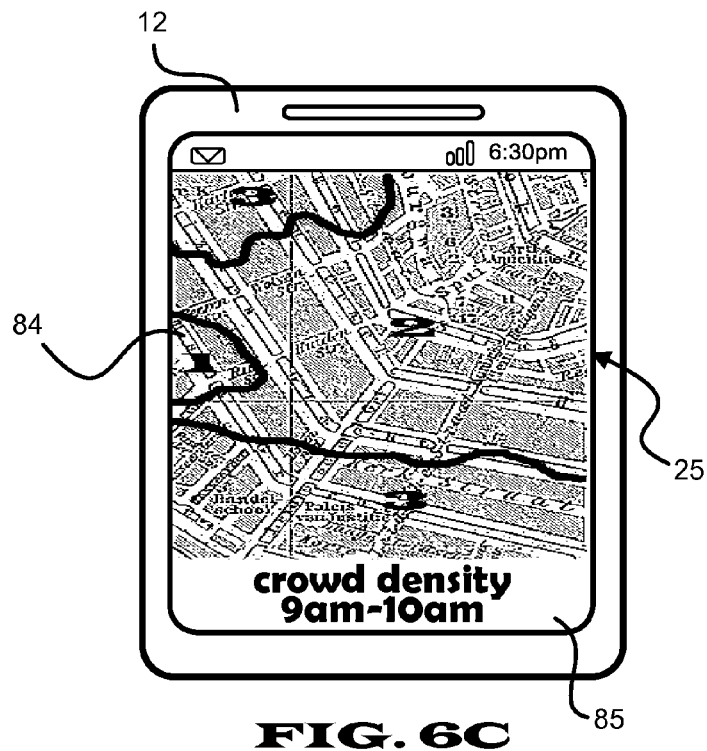

FIGS. 6A, 6B, and 6C show heat maps 80, 82, 84 corresponding to the particular day referenced in the preceding paragraph on the display 25 of a mobile device 12. Alternatively, the heat maps 80, 82, 84 can be displayed by one of the devices 16 not running the monitoring agent 13. The heat maps 80, 82, 84 are enabled on the display 25 by the user application 22 and user interface 19. The heat maps 80, 82, 84 are generated based on sensor measurements including sound measurements and acceleration measurements which are run through a classifier in the analytics engine 30 to estimate density of people ("crowd density") in areas bounded by dark lines within the heat maps 80,82,84. Dimensionless crowd density represented by "1" for relatively low crowd density, "2" for relatively medium crowd density, and "3" for relatively high crowd density are displayed within the bounded areas to show relative crowd density during indicated time periods on the particular day. Labels 81, 83, 85 indicate the time periods during the particular day respectively corresponding to the heat maps 80, 82, 84, wherein the first heat map 80 corresponds to 7:00 am to 8:00 am, the second heat map 82 corresponds to 8:00 am to 9:00 am, and the third heat map 84 corresponds to 9:00 am to 10:00 am.

A determined state of a geographic area can be associated with a statistical likelihood. The statistical likelihood of a particular categorization can be determined by the analytics engine 30 based on factors including the number of sensor measurements captured and a classification accuracy due to attenuation correction of the sensor measurements. More sample sensor measurements and less attenuation correction leads to a higher statistical likelihood for a particular categorization, whereas less sample sensor measurements and more attenuation correction leads to a lower statistical likelihood for a particular categorization. For example, sound levels in a given geographic area can be expressed as a likelihood (e.g. 60%) that there exists excessive amounts of noise in the geographic area.

Figure 7:
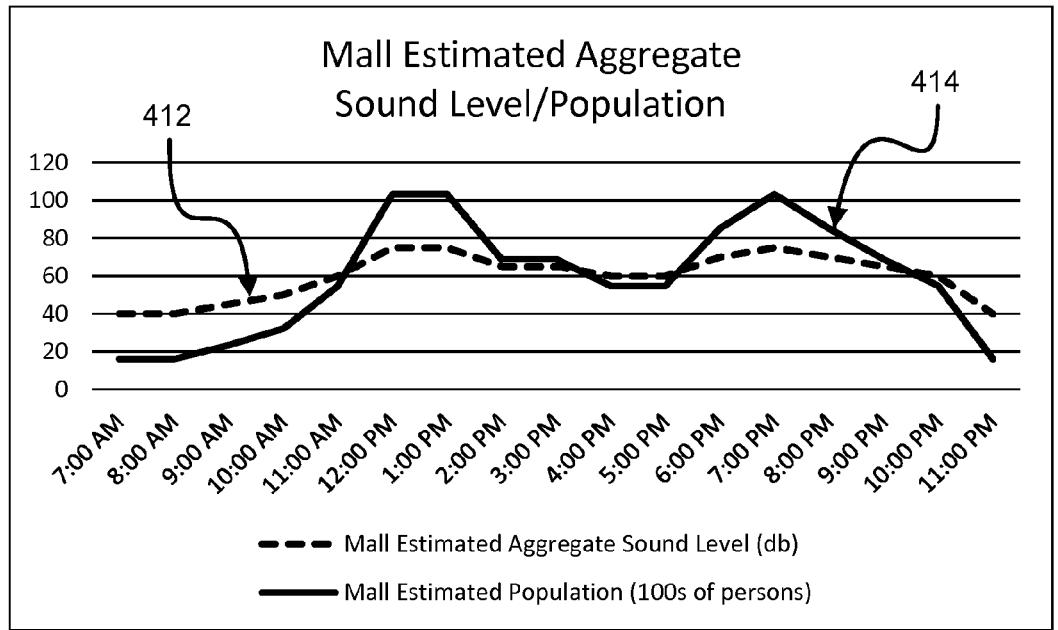
FIG. 7 is a histogram showing a plot of estimated aggregated sound level and estimated population at a particular shopping mall on a particular day.

The monitoring agent 13 in mobile devices 12 and the analytics manager 20 allow for real-time reporting of states of a particular area determined based on sensor measurements. A state determined by the analytics engine 30 can be used as a proxy for a measure of activity in the particular area. For example sound levels in a shopping mall can be used as a proxy for the number of people at the mall. Someone wishing to avoid the shopping mall when it is very crowded can consult an aggregate measure of sound level provided by the user application 22 at the mall. Alternatively, the analytics engine 30 can convert sound level to a measure of traffic using a particular classifier. Further, the user application 22 can provide a histogram showing sound levels and/or traffic levels at a particular location (e.g. a shopping mall). FIG. 7 shows an exemplary histogram 410 showing a plot of determined estimated aggregated sound level (db) 412 with corresponding estimated population (100s of persons) 414 at a particular shopping mall on a particular day from 7:00 am to 11:00 pm. Using the user application 22, a shopper can check the histogram 410, or other histogram for a particular day, and/or current real-time sound levels/population estimates, to determine a preferred time or preferred day to go to the shopping mall.

Figure 8:
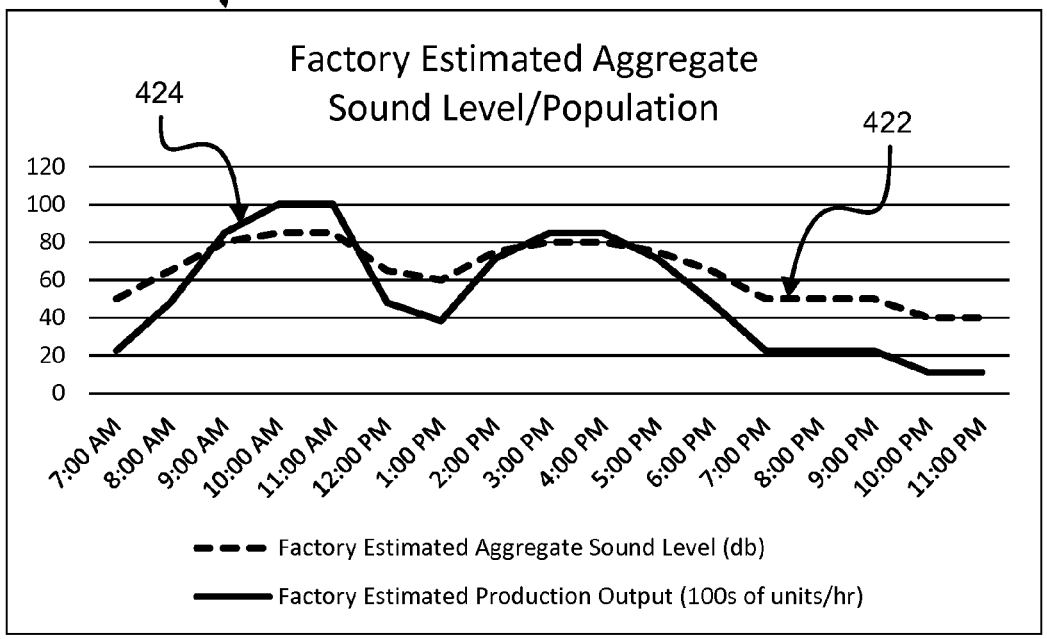
FIG. 8 is a histogram showing a plot of estimated aggregated sound level and estimated production output at a particular factory on a particular day.

In another example, the analytics engine 30 estimates factory production based on sound measurements from mobile devices 12, wherein an aggregate number and level of detected sounds in a factory can be used as a metric to determine an amount of activity in the factory. FIG. 8 shows an exemplary histogram 420 showing an example plot of determined estimated aggregated sound level (db) 422 with corresponding estimated production output (100s of units/hour) 424 at a particular factory on a particular day from 7:00 am to 11:00 pm. A factory manager can gauge worker efficiency by checking the histogram for a particular day and/or current real-time sound levels/production output estimates via the user application 22.

Figure 9:
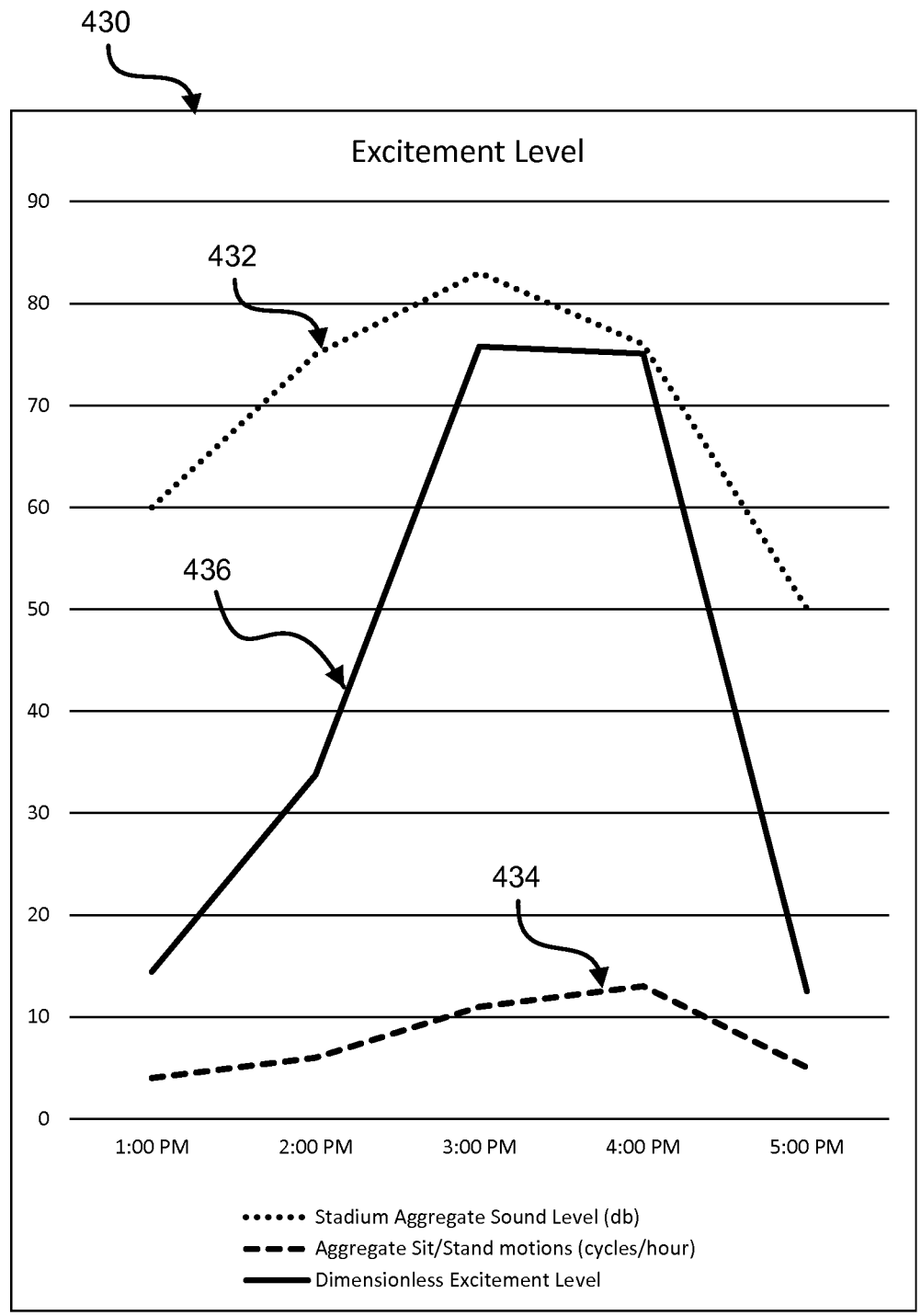
FIG. 9 is a histogram showing a plot of estimated aggregated sound level, estimated sit/stand cycles, and estimated excitement level at a particular sports stadium.

In another example, a number and level of detected crowd category sounds from a plurality of mobile devices 12 at a stadium are used to determine how many people are at the stadium. Further, the analytics engine 30 can determine that motion measurements (e.g., accelerometer measurements) correspond to frequent sitting and standing and further determine a level of crowd excitement, which information can be provided to a user. FIG. 9 shows an exemplary histogram 430 showing a plot of determined estimated aggregated sound level (db) 432, estimated sit/stand cycles (cycles/hour) 434, and predicted level of excitement 436 at a particular sports stadium on a particular day from 1:00 pm to 5:00 pm. A sport team's management department can check via the user application 22 the histogram for a particular day and/or check current real-time sound levels/sit-stand cycles/excitement level estimates to determine patron satisfaction.

Determining the state of a geographic area can include estimating the position of an event based on the sensor data and location data from a plurality of mobile devices 12, which position can be provided to a user of a mobile device 12 or other device 16. When sensors on a plurality of mobile devices 12 positioned at different locations measure an event that is external to the device, for example a remote sound, the analytics manager uses the multiple measurements from the mobile devices 12, potentially taken at different times, to determine a source of the event. For example, if a gunshot occurs, and multiple mobile devices 12 capture the sound of the gunshot at different locations, the analytics engine 30 can identify the sound as a gunshot and can determine the location at which the gunshot occurred. The relative attenuation (i.e., sound level) of each of the sound measurements or the time the sounds were received and the location where the mobile device 12 received the sound are used to determine the position of the gunshot.

Determining the state of a geographic area can correspond to determining a type of activity based on sensor measurements such as motion measurements (e.g., acceleration) and/or sound measurements, wherein a user can be provided an indication of one or more types of activities corresponding to the measurements, for example in the form of a map.

As performed by the analytics engine 30, motion classification and sound classification tend to differ in scope. Sound classification typically corresponds to a quality of the environment in which a mobile device 12 operates. Motion classification typically corresponds to activities people are engaged in, in the environment. Motion measurements and sound measurements individually or in combination can be used to characterize a type of activity occurring at a particular place.

As indicated above, motion data can be collected by an accelerometer 17 of a mobile device 12. Motion data can be analyzed by the analytics engine 30 through a classifier to determine with high probability the motion-based activity of the user of the mobile device 12, for example driving, biking, walking, or remaining stationary (no substantial motion). Based on tuples generated from such activities from a plurality of mobile devices 12, the analytics engine 30 can determine a plurality of types of activity including where people are driving, where people are biking, where a high density of people are stationary (e.g., a crowded beach), and places where people are converging toward. Motion toward a particular area followed by stationary behavior at the particular area can be classified as a place where people are converging toward, for example a fireworks celebration or a flash mob. Classifications can be provided to a user via the user application 22 of the analytics manager 20 as a heat map.

Another application of the described systems includes determining based on sound measurements and/or motion (e.g., acceleration) measurements gathering places such as bars and restaurants where patrons commonly dance. A further application includes determining when a movie commences at a movie theatre based on sound measurements and/or motion measurements, for example determining that patrons are sitting with little measurable motion, that being indicative of the movie having begun.

The described systems permit characterizing locations at which an activity occurs over a broad area, such as a city. For example, the user application 22 can enable display of a heat map showing where people ride bicycles in San Francisco, by implementing a motion classifier on aggregated sensor measurements such as accelerometer measurements from a plurality of mobile devices 12. Such information can be used to determine regions within the city that require increased separation between auto and bicycle traffic flow. A heat map can further be provided showing foot traffic based on output from a classifier configured to determine walking motion from sensor measurements such as accelerometer measurements.

Figure 10:
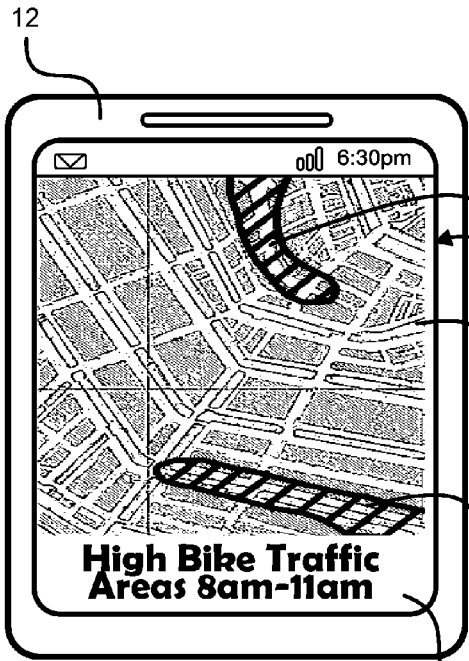
FIGS. 10-13 show heat maps displayed on a device showing traffic areas for various modes of transportation during a particular period of time during a day.
Figure 11:
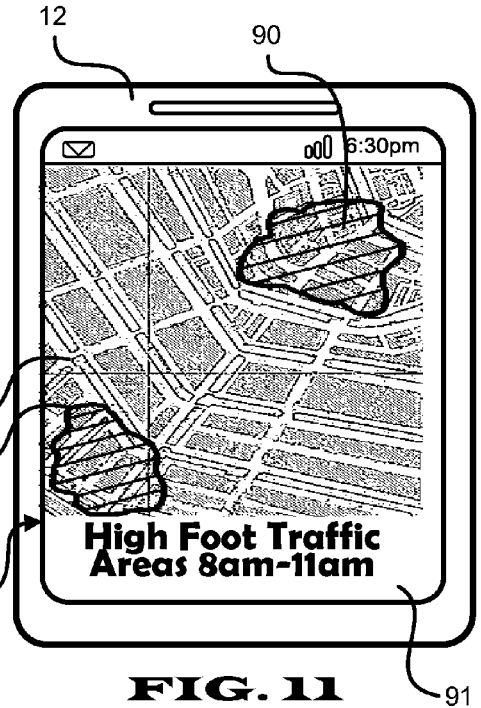
Figure 12:
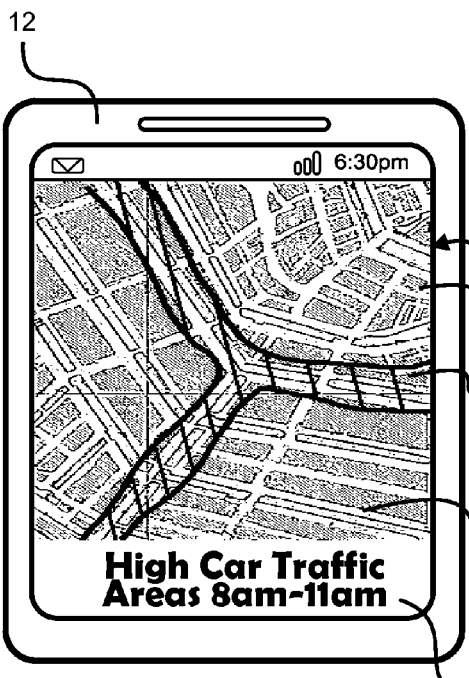
Figure 13:
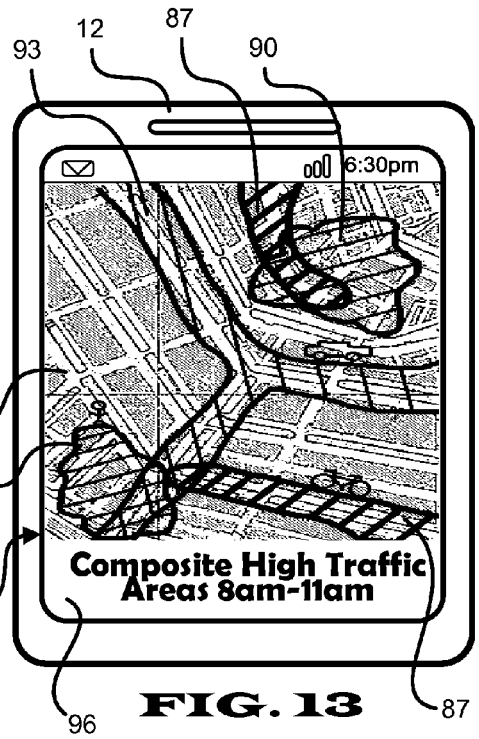
Figure 14:
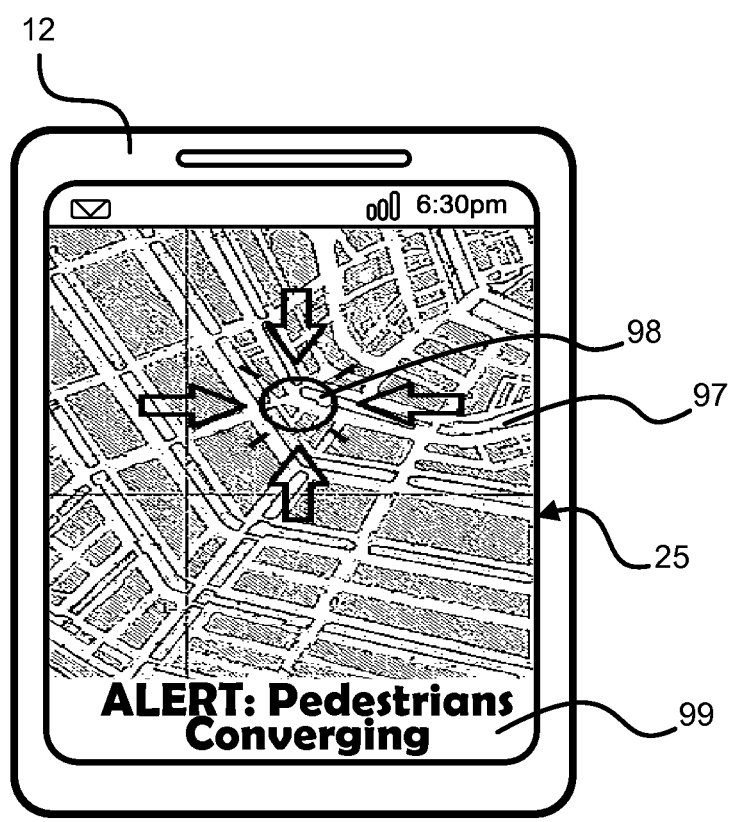
FIG. 14 shows an alert map displayed on a device showing a location at which a group of people are converging.

FIG. 10 shows on a display 25 of a mobile device 12 an exemplary heat map 86 provided by the user application 22 which indicates by shaded portions 87 areas of high bicycle traffic for the time period between 8:00 am and 11:00 am on a particular day. FIG. 11 shows on a display 25 of a mobile device 12 an exemplary heat map 89 which indicates by shaded portions 90 locations of high pedestrian foot traffic for the time period between 8:00 am and 11:00 am on the particular day. FIG. 12 shows on a display 25 of a mobile device 12 an exemplary heat map 92 which indicates by shaded portion 93 locations of high vehicle traffic for the time period between 8:00 am and 11:00 am on the particular day. FIG. 13 shows on a display 25 of a mobile device 12 an exemplary heat map 95 including all shaded portions 87, 90, 93 to indicate areas of high bicycle traffic, high foot traffic, and high vehicle traffic between 8:00 am and 11:00 am on the particular day. FIG. 14 shows on a display 25 of a mobile device 12 an alert map 97 provided by the user application 22 which indicates in real-time that a group of people are converging at a particular location represented by a marker 98 on the alert map 97. Labels 88, 91, 94 indicate the time periods during the particular day and a description of the type of traffic respectively corresponding to the heat maps 86, 89, 92. Label 99 provides an indication that pedestrians are converging as shown in the alert map 97.

The heat maps 90, 92, 94, 96 in FIGS. 10-13 can show changes in illustrated traffic areas over a particular period of time corresponding to hours in the day, days in the week, current real-time, or other prescribed time period, for example as an animation or slideshow, to provide a user with an insight into how traffic patterns change during such time period. Likewise, the alert map 98 in FIG. 14 can show movement of the particular convergence location.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method for providing an indication of one or more states of a geographic area, the method comprising:
    providing an application on a plurality of mobile devices enabling collection of measurements from sensors on the plurality of mobile devices;
    acquiring via the application sensor data comprising audio data based on sensor measurements comprising sound measurements taken by the plurality of mobile devices at a plurality of locations;
    acquiring location data corresponding to the plurality of locations of the sensor measurements;
    determining, by at least one processor, a plurality of states of a geographic area corresponding to the plurality of locations based on the audio data and the location data, the plurality of states comprising a plurality of densities of people of the geographic area; and
    providing via the application an indication of the plurality of states of the geographic area to a particular user of one of the plurality of mobile devices, the indication comprising a mapping of the plurality of densities of people in the geographic area.

2. The method of claim 1, wherein the sensor measurements include sound recordings from sensors on the plurality of mobile devices.

3. The method of claim 1, wherein the sensor measurements include acceleration measurements from sensors on the plurality of mobile devices; the method further comprising:
    determining a plurality of modes of transport in use in the geographic area based at least on the acceleration measurements; and
    providing the indication of the plurality of states of the geographic area with a mapping of the plurality of modes of transport in the geographic area.

4. The method of claim 1, further comprising acquiring time stamps corresponding to the sensor data and the location data; the method further comprising:
    determining the plurality of densities of people in the geographic area over a particular time period; and
    providing the indication of the plurality of geographic areas with a mapping of the plurality of densities of people in the geographic area over the particular time period.

5. The method of claim 1, further comprising applying a classifier to the sensor data to determine the plurality of states of the geographic area.

6. The method of claim 1, further comprising:
transmitting via the application by the plurality of mobile devices the sensor data and the location data via a network to a server system comprising the at least one processor; and
determining by the server the plurality of states of the geographic area based on the sensor data.

7. The method of claim 6, further comprising:
transmitting via the application to the server system by the plurality of mobile devices indications of at least one of a device type, a device operating system, and device settings corresponding respectively to the plurality of mobile devices; and
determining by the server the plurality of states of the geographic area further based on the at least one of the device type, the device operating system, and the device settings corresponding respectively to the plurality of mobile devices.

8. The method of claim 7, further comprising applying a classifier to the sensor data, the device type, the device operating system, and the device settings to determine the plurality of states of the geographic area.

9. The method of claim 7, wherein determining the plurality of states of the geographic area comprises determining a sound level of the geographic area based on the sound measurements and at least one of the device type, the device operating system, and device settings.

10. The method of claim 1, further comprising:
determining by the plurality of mobile devices aggregates based on the sensor measurements respectively taken by the plurality of mobile devices;
transmitting via the application the location data and the sensor data comprising the aggregates via a network to a server system comprising the at least one processor; and
determining by the at least one processor the plurality of states of the geographic area based on the aggregates.

11. The method of claim 1, further comprising:
determining at least one baseline value of sensor measurements of a particular mobile device taken over a period of time; and
comparing a particular sensor measurement from the particular mobile device with the at least one baseline value;
determining a normalized value for the particular sensor measurement based on the comparing of the particular sensor measurements with the baseline value; and
determining the plurality of states of the geographic area based on the normalized value.

12. The method of claim 1, wherein determining the plurality of states of the geographic area comprises determining categories corresponding to the sensor measurements taken by the plurality of mobile devices.

13. The method of claim 1, wherein the sensor measurements include sound recordings from sensors on the plurality of mobile devices, and wherein the sound recordings from the plurality of mobile devices are considered in aggregate to determine the plurality of states of the geographic area.

14. The method of claim 1, wherein the sensor measurements further comprise acceleration measurements from sensors on the plurality of mobile devices, and wherein acceleration measurements from the plurality of mobile devices are considered in aggregate to determine the plurality of states of the geographic area.

15. The method of claim 14, further comprising determining running by a plurality of users of the plurality of mobile devices based on the acceleration measurements, wherein determining the plurality of states of the geographic area comprises determining the existence of a disturbance at the geographic area based on the determination of running by the plurality of users.

16. The method of claim 1, wherein the sensor measurements further comprise acceleration measurements from sensors on the plurality of mobile devices, and wherein the acceleration measurements and sound measurements from the plurality of mobile devices are considered in aggregate to determine a type of the geographic area.

17. The method of claim 16, further comprising:
determining walking in a particular speed range and talking by a plurality of users of the plurality of mobile devices based on the acceleration measurements and the sound measurements; and
determining the type of the geographic area is a shopping mall based on determining the walking in the particular speed range and talking by the plurality of users.

18. The method of claim 1, wherein the sensor measurements further comprise acceleration measurements from sensors on the plurality of mobile devices, and wherein the sound measurements and the acceleration measurements from the plurality of mobile devices are considered in aggregate to determine the plurality of states of the geographic area at particular times, and wherein the indication comprises a mapping of the plurality of densities of people in the geographic area at particular times.

19. The method of claim 18, further comprising:
predicting the plurality of states of the geographic area at a future time based on the plurality of states of the geographic area at the particular times;
providing a plurality of indications comprising a plurality of mappings of the plurality of densities of people in the geographic area at particular times.

20. The method of claim 1, wherein determining the plurality of states of the geographic area comprises determining implicit categories corresponding to the sensor measurements taken by the plurality of mobile devices, wherein like sensor measurements correspond to like implicit categories, the method further comprising:
providing via the application an indication of the implicit categories to a plurality of users;
receiving descriptions corresponding to the implicit categories from the plurality of users; and
providing the indication of the plurality of states of the geographic area to the particular user including the descriptions corresponding to the implicit categories provided by the plurality of users.

21. The method of claim 20, wherein determining the implicit categories comprises applying a clusterization algorithm to the sensor measurements.

22. The method of claim 1, wherein providing the indication of the plurality of states comprises displaying a map of the geographic area comprising a visual representation of the plurality of states on the geographic area.

23. The method of claim 22, wherein the plurality of states corresponds to a plurality of sound levels over the geographic area.

24. The method of claim 22, further comprising displaying on the map differences in a value of the plurality of states corresponding to different times.

25. The method of claim 24, further comprising displaying on the map changes in a value of the plurality of states over a particular time period.

26. The method of claim 1, wherein determining the plurality of states of the geographic area comprises determining at least one category as a statistical likelihood.

27. The method of claim 26, wherein the statistical likelihood corresponds to a likelihood there exists a level of sound exceeding a particular threshold in the geographic area.

28. The method of claim 1, wherein determining the plurality of states of the geographic area comprises estimating a measure of activity in the geographic area based on the sensor data.

29. The method of claim 1, wherein the sensor measurements include sound measurements, and wherein determining the plurality of states of the geographic area comprises estimating factory production based on the sound measurements, and wherein providing the indication comprises providing an indication of the factory production.

30. The method of claim 1, wherein the sensor measurements further comprise acceleration measurements, wherein determining the plurality of states of the geographic area comprises:
   determining sitting and standing of users of the plurality of mobile devices based on the sensor measurements; and
   determining a level of crowd excitement based on the determination of sitting and standing of the users of the plurality of mobile devices;
   wherein providing the indication comprises providing an indication of the level of crowd excitement.

31. The method of claim 1, wherein determining the plurality of states of the geographic area comprises estimating a position of an event based on the sensor data and the location data, and wherein providing the indication comprises providing the position of the event.

32. The method of claim 31, wherein determining the plurality of states of the geographic area comprises:
   determining the event corresponds to a gunshot based on the sound measurements; and
   estimating a position where the gunshot originated based on a sound level of at least two of the sensor measurements from at least two of the plurality of mobile devices respectively taken at at least two of the plurality of locations;
   wherein providing the indication of the plurality of states of the geographic area comprises providing the estimated position where the gunshot originated.

33. The method of claim 1, wherein the sensor measurements further comprise motion measurements, wherein determining the plurality of states of the geographic area comprises determining a plurality of types of activity based on the sensor measurements, and wherein providing the indication to the user comprises providing an indication of the plurality of types of activity.

34. The method of claim 33, wherein providing the indication of the plurality of types of activity comprises displaying a map showing the types of activity over a period of time.

35. The method of claim 33, wherein determining the plurality of types of activity comprises determining driving and biking, wherein the types of activity displayed comprise driving and biking.

36. The method of claim 33, wherein determining the plurality of types of activity comprises determining walking and driving, wherein the types of activity displayed comprise walking and driving.

37. The method of claim 1, wherein the sensor data comprises at least one of sensor measurements and aggregates of sensor measurements.

38. A computing system comprising at least one non-transitory computer readable storage medium having encoded thereon instructions that, when executed by one or more processors of the system, cause the system to perform a process including:
   providing an application on a plurality of mobile devices enabling collection of measurements from sensors on the plurality of mobile devices;
   acquiring via the application sensor data comprising audio data based on sensor measurements comprising sound measurements taken by the plurality of mobile devices at a plurality of locations;
   acquiring location data corresponding to the plurality of locations of the sensor measurements;
   determining, by at least one processor, a plurality of states of a geographic area corresponding to the plurality of locations based on the audio data and the location data, the plurality of states comprising a plurality of densities of people of the geographic area; and
   providing via the application an indication of the plurality of states of the geographic area to a particular user of one of the plurality of mobile devices, the indication comprising a mapping of the plurality of densities of people in the geographic area.

39. A computer network comprising a computing system and a plurality of mobile devices, the computing system configured for:
   acquiring sensor data comprising audio data based on sensor measurements taken by the plurality of mobile devices at a plurality of locations;
   acquiring location data corresponding to the plurality of locations of the sensor measurements;
   determining, by at least one processor, a plurality of states of a geographic area corresponding to the plurality of locations based on the audio data and the location data, the plurality of states comprising a plurality of densities of people of the geographic area; and
   providing an indication of the plurality of states of the geographic area to a particular user of one of the plurality of mobile devices, the indication comprising a mapping of the plurality of densities of people in the geographic area; and
the plurality of mobile devices comprising an application configured for:
   taking sensor measurements via device sensors on mobile devices;
   acquiring location data corresponding to the sensor measurements via location determining hardware on the plurality of mobile devices; and
   transmitting the sensor data and location data to the computing system via a network.

40. A method for providing an indication of a plurality of states of a geographic area, the method comprising:
   providing an application on a plurality of mobile devices enabling collection of measurements from sensors on the plurality of mobile devices;
   acquiring via the application sensor data comprising audio data based on sensor measurements taken by the plurality of mobile devices at a plurality of locations;
   acquiring via the application location data from the plurality of mobile devices corresponding to the plurality of locations of the sensor measurements;
   determining, by at least one processor, a plurality of states of a geographic area corresponding to the plurality of locations based at least on the audio data and the location data;
   assigning implicit categories to the plurality of states, wherein like sensor measurements correspond to like implicit categories;

providing via the application an indication of the implicit categories to a plurality of users of the plurality of mobile devices;

receiving descriptions corresponding to the implicit categories from the plurality of users; and providing via the application to a particular user of one of the plurality of mobile devices an indication of the implicit categories and the corresponding descriptions from the plurality of users.

41. A method for reporting patron satisfaction at a particular venue comprising:

providing an application on a plurality of mobile devices enabling monitoring of sensors on the plurality of mobile devices;

acquiring via the application sensor data comprising audio data and acceleration data based on sensor measurements taken by the plurality of mobile devices at a plurality of locations at a particular venue;

acquiring via the application location data from the plurality of mobile devices corresponding to the plurality of locations of the sensor measurements;

determining sitting and standing of users of the plurality of mobile devices at the particular venue based on at least one of the audio data and acceleration data;

determining a sound level at the particular venue based at least on the audio data;

determining a level of crowd excitement at the particular venue over a particular time period based at least on the determination of sitting and standing of the users of the plurality of mobile devices and the sound level; and providing via the application an indication of the level of crowd excitement over the particular time period.

\* \* \* \* \*